United States Patent
Malie et al.

[11] Patent Number: 6,109,505
[45] Date of Patent: Aug. 29, 2000

[54] METHOD OF DIFFUSION BRAZING SUPERALLOY PARTS

[75] Inventors: André Hubert Louis Malie, Targe; Michel Grosbras, Bonnes; Marie-France Beaufort, Saint Benoit; Frédéric Jacquot, Niort; Jean-Pierre Huchin, Chatellerault, all of France

[73] Assignee: SNECMA Services, Paris, France

[21] Appl. No.: 09/357,654

[22] Filed: Jul. 20, 1999

[30]    Foreign Application Priority Data

Jun. 23, 1998 [FR] France ................................. 98 09396

[51] Int. Cl.⁷ ........................... B23K 31/00; B23K 20/00; B23K 3/06
[52] U.S. Cl. ........................... 228/119; 228/244; 228/194
[58] Field of Search ................................. 228/119, 124.5, 228/244, 194

[56]    References Cited

U.S. PATENT DOCUMENTS

| | | | |
|---|---|---|---|
| 4,507,051 | 3/1985 | Lesgourgues et al. | 416/97 R |
| 4,579,587 | 4/1986 | Grant et al. | 75/338 |
| 4,614,296 | 9/1986 | Lesgourgues | 228/194 |
| 4,631,082 | 12/1986 | Andrews et al. | 75/235 |
| 4,655,383 | 4/1987 | Fournes et al. | 228/119 |
| 4,713,217 | 12/1987 | Stern. | |
| 5,071,059 | 12/1991 | Heitman et al. | 228/244 |
| 5,156,321 | 10/1992 | Liburdi et al. | 228/119 |
| 5,367,048 | 11/1994 | Shaw | 528/367 |

FOREIGN PATENT DOCUMENTS

| | | |
|---|---|---|
| 0 559 229 | 9/1993 | European Pat. Off. . |
| 2 296 491 | 7/1976 | France . |
| 2 511 908 | 3/1983 | France . |
| WO 93/04807 | 3/1993 | WIPO . |

*Primary Examiner*—Gregory Mills
*Assistant Examiner*—C. Newsome
*Attorney, Agent, or Firm*—Oblon, Spivak, McClelland, Maier & Neustadt, P.C.

[57]    ABSTRACT

A method of diffusion brazing parts made of a superalloy A uses a single-component brazing powder prepared by measuring a quantity of a superalloy powder having a composition identical to the superalloy A and a quantity of a boron and/or silicon flux powder in a proportion of between 0.1% and 40% by weight of the superalloy powder, mixing the powders and placing them with balls made of superalloy A in a container also made of superalloy A, closing the container and keeping its contents in a controlled atmosphere, placing the container in a grinder and operating the grinder to keep the container moving for a period ranging from 30 seconds to 500 hours in order to encrust the flux onto the surface of the grains of the superalloy powder.

7 Claims, 2 Drawing Sheets

METHOD OF DIFFUSION BRAZING SUPERALLOY PARTS

BACKGROUND OF THE INVENTION

1. Field of the Invention

The present invention relates to a method of diffusion brazing parts made of a nickel-, cobalt- or iron-based superalloy having a polycrystalline or monocrystalline structure. The method is particularly applicable to the joining of parts and to the repair of parts by resurfacing, particularly in the aeronautical field.

2. Summary of the Prior Art

The severe operating conditions imposed, for example, on the blades of turbo machines and of industrial turbines demand, in particular, excellent high temperature resistance to oxidation and/or excellent corrosion resistance combined with good high temperature mechanical properties such as good creep resistance, and have given rise to the use of nickel-, cobalt- or iron-based superalloys to fabricate them. For producing assemblies or carrying out repairs by resurfacing, the current techniques of welding with fusion prove to be poorly adapted to these materials or would be complex and often impracticable to carry out.

Diffusion brazing methods have therefore been used. These methods aim to obtain bonds which are homogeneous from the chemical and structural point of view, while avoiding deeply altering the metallurgical structure of the material. An example of such a method is disclosed in EP-A-0075497.

It is known, in order to carry out repairs by resurfacing, to use brazing powders known as dual-component powders and consisting of a mixture of two powders obtained, for example, by pulverizing under argon:

a superalloy powder with a chemical composition close to that of the material to be repaired; and a nickel- or cobalt-based powder containing 2 to 6% by weight of flux elements such as boron or silicon.

The diffusion brazing operation is carried out at a temperature which lies between 1050° C. and 1220° C. and which is below the melting temperature of the superalloy. At the selected temperature of operation, the superalloy powder remains in the solid state and the powder containing the flux elements becomes liquid, thus ensuring the fluidity of the mixture. The brazing of the grains of superalloy powder together causes a densification and, by diffusion of the flux elements, isothermal solidification of the liquid joint is obtained at the brazing temperature. Interdiffusion between the brazed joint and the superalloy of the basic metal ensures the homogenization of the chemical compositions. After the conventional thermal treatments, the regions resurfaced by diffusion brazing exhibit the high-temperature mechanical properties sought, being very close to those of the basic material of the parts. Moreover, the known coatings for enhancing resistance to corrosion and to oxidation at high temperature may be applied.

However, the known diffusion brazing methods using dual-component powders entail certain constraints and drawbacks as regards implementation:

the operation of mixing the two powders is lengthy and tedious, the homogenization of the chemical composition of the mixture is intricate and requires numerous checks, but remains vital, special storage conditions have to be provided in order to avoid any segregation of the mixture, and the ratio of the proportions of the two powders in the mixture should moreover be adapted according to the nature of the resurfacing and, in particular, to the width of the cracks to be repaired.

SUMMARY OF THE INVENTION

With the aim of avoiding the drawbacks of the known methods, the invention provides a method of diffusion brazing parts made of a superalloy A using a filler material obtained from a brazing powder, said method comprising the following steps:

(a) preparing a predetermined quantity of a superalloy powder having a composition identical to said superalloy A of said parts, and a quantity, in a weight ratio to said superalloy powder of between 0.1% and 40%, of a powder of at least one flux element selected from the group of boron and silicon;

(b) mixing the powders prepared in step (a) and placing the powder mixture together with a plurality of balls into a container, then closing the container and maintaining it under a controlled atmosphere, said balls and said container being made of said superalloy A;

(c) placing said container in a grinder and maintaining movement of the container for a period of from 30 seconds to 500 hours in order to incorporate the flux element onto the surface of the grains of said superalloy powder to thereby form a so-called single component powder;

(d) chemically cleaning the surfaces of said parts to be brazed in a bath;

(e) thermochemically treating said parts in a furnace;

(f) depositing a filler on said surfaces of said parts, said filler consisting of said single-component powder obtained in step (c);

(g) carrying out a thermal brazing cycle in said furnace wherein the temperature is increased in steps up to a brazing temperature of between 1050° C. and 1400° C. depending on the superalloy, and is then held for a time of from 15 to 30 minutes; and (h) carrying out a thermal diffusion treatment in said furnace under a controlled atmosphere for a period of between 4 and 16 hours.

Other preferred features and advantages of the invention will become apparent from the following description of preferred embodiments of the diffusion brazing method in accordance with the invention, with reference to the attached drawings.

DESCRIPTION OF THE PREFERRED EMBODIMENTS

Figure 1:
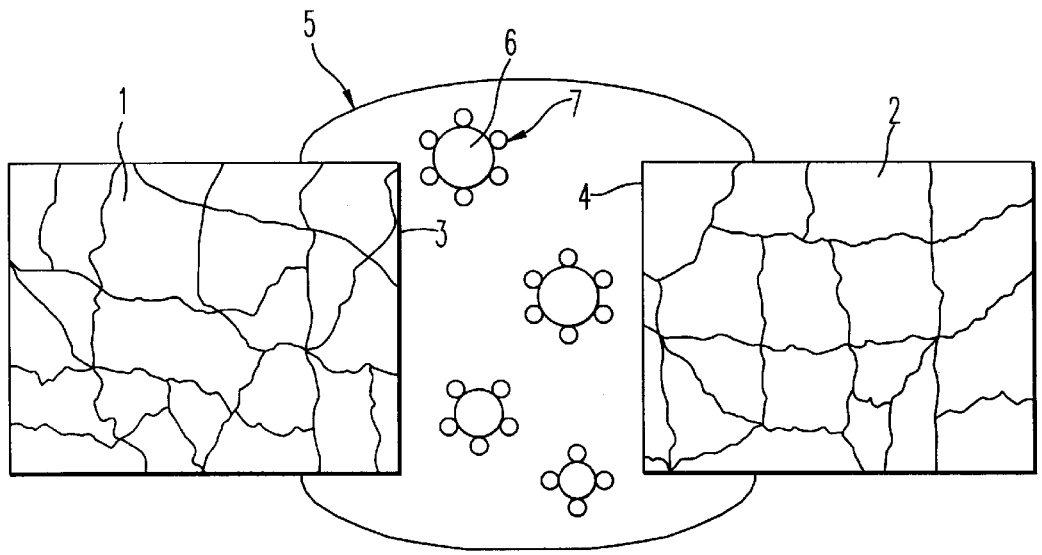
FIGS. 1,2 and 3 are diagrammatic views illustrating the physical chemistry states of the bonding layer at three different stages of the joining of two superalloy parts by a diffusion brazing method in accordance with the invention.

The diffusion brazing method in accordance with the invention is applicable to the fabrication or repair of nickel-, cobalt- or iron-based superalloy parts. In particular the method can be used to produce an assembly of such parts, or to fill a crack in a part, or to resurface a part in order to restore its dimensions.

In accordance with the invention, a brazing powder, referred to as a single-component brazing powder, is used in the diffusion brazing method. This single-component powder is obtained by a sequence of manufacturing operations comprising the following steps:

the required quantity of boron and/or silicon powder is measured, by simple weighing, according to the chosen proportion by weight of the flux elements in the nickel-, cobalt- or iron-based superalloy powder, the proportion lying within the range of from 0.1% to 40% by weight;

the nickel-, cobalt- or iron-based superalloy powder and the boron and/or silicon flux powder are mixed for several minutes;

the mixture of the superalloy and flux powders is deposited with nickel-, cobalt- or iron-based superalloy balls in a nickel-, cobalt- or iron-based superalloy container, the container is closed by a cover possessing a Teflon seal, and the container is then evacuated or placed in a neutral atmosphere so as to limit oxygen contamination;

the container is placed in a grinder, which is then operated for a grinding time of from 30 seconds to 500 hours;

when the grinding is finished, the container is opened, either in air, or in an inert atmosphere in order to limit oxygen contamination;

the "single-component" brazing powder is recovered from the container and is then stored in an inert atmosphere so as to limit oxygen contamination.

During the grinding operation, the movement of the balls in the container causes impacts between the balls and the grains of powder and against the walls of the container, and these impacts have the effect of encrusting the flux elements on to the surface of the superalloy grains. The grinder which imparts the movement to the container may be of any known vibratory, planetary or horizontal type.

This advantageous method of manufacturing the single-component powder makes it possible to eliminate the lengthy operations involved in mixing conventional dual component powders. Only one mixing for a few minutes is needed in order to distribute the flux powder homogeneously among the grains of superalloy powder before carrying out the mechanical synthesis with the grinder.

The encrusting of the flux elements on the surface of the superalloy powder grains makes it possible to ensure a uniform chemical composition, which is an important condition for obtaining satisfactory results when using the brazing powder. The chemical composition checks may consequently be simplified.

The method of manufacturing the single-component powder also makes it possible to obtain satisfactory results when retaining a larger proportion of superalloy powder in its composition in comparison with the conventionally used dual-component powders. Consequently, the areas of parts to which the brazing powder is applied and subjected to diffusion brazing exhibit better mechanical properties, particularly in the case of turbo machine parts which are subject to creep stress at high temperature.

The production of an assembly or the repair of superalloy parts by diffusion brazing requires preparation of the surface of the parts. In particular, for turbo machine parts made of nickel-, cobalt- or iron-based superalloy which have been cracked or damaged after exposure to high-temperature combustion gases and which have a contaminated surface layer, chemical cleaning operations in a bath are carried out, comprising the following:

descaling in an acid or alkaline bath followed by rinsing;

conditioning of oxides in an alkaline permanganate bath or in a molten soda bath followed by rinsing;

immersion in an acid bath consisting of an aqueous solution of hydrochloric acid, nitric acid, acetic acid, phosphoric acid and of a ferric salt, followed by rinsing.

After removal of the contaminated layer covering the part, surface preparation is completed by a thermochemical treatment under conditions which are known in themselves. This treatment is carried out in a semi-sealed enclosure in which is placed a hardening composition based on chromium and ammonium fluoride, the said enclosure being placed in a furnace with a controlled hydrogen atmosphere.

Depending on the specific applications and according to the size and configuration of the defects to be repaired on the parts, a supplementary brazing operation may be carried out.

In this case, a filler metal consisting of a nickel- or cobalt-based alloy and including a flux element such as boron is deposited on the surface of the areas involved, and then a thermal brazing cycle is carried out, with an increasing brazing temperature for a time of 15 minutes, so as to cause the filler metal to melt and the surfaces to be wetted.

A filler consisting of the single-component powder obtained as described earlier is then applied to the affected areas of the part. Next, a thermal brazing cycle is carried out in the furnace, the temperature being increased in steps up to a brazing temperature which is between 1050° C. and 1400° C. and which is determined so as to remain below the melting temperature of the superalloy constituting both the part and the brazing powder before the mechanical synthesis operation, and the temperature then being held for from 15 to 30 minutes.

Finally a thermal diffusion treatment is carried out in the furnace under a controlled atmosphere, which may be vacuum or an inert atmosphere, for a period of time between 4 and 16 hours, so as to ensure adequate homogenization of the brazed region.

Figure 2:
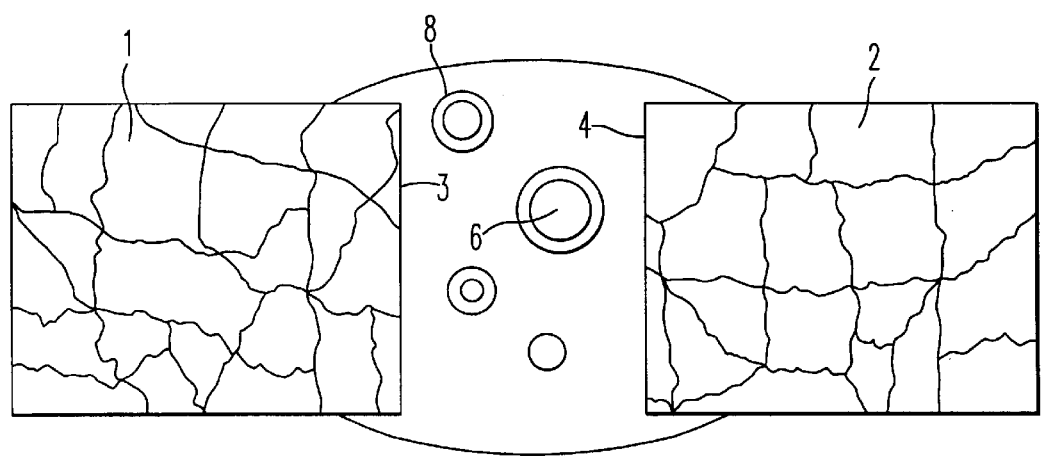
Figure 3:
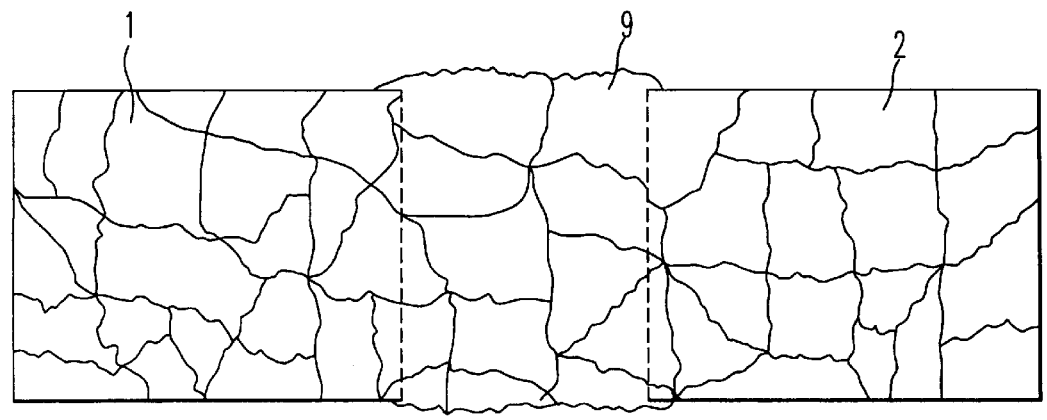

FIGS. 1,2 and 3 illustrate in a diagrammatic manner, an example of the application of the diffusion brazing method in accordance with the invention as just described to the joining of two parts 1 and 2. In FIG. 1, the single-component brazing powder 5 consisting of grains 6 of superalloy which are enriched by the flux elements 7 encrusted on the surface of the grains is shown deposited between the surfaces 3 and 4 of the parts 1 and 2 which are to be joined.

In FIG. 2, the flux elements 7 and a part of the area close to the surface of the superalloy grains 6 have changed to the liquid state, and the liquid phase 8 thus constituted wets the surfaces 3 and 4 and the superalloy grains 6. As a result of the small dimensions of the grains, the liquid phase 8 is retained by capillary action.

FIG. 3 shows the result obtained on completion of the diffusion treatment. An intermediate layer 9 has solidified, exhibiting a homogeneous metallographic structure bonded by diffusion to the parts 1 and 2. The surfaces 3 and 4 which constituted the original limits of the parts 1 and 2 are shown symbolically by dotted lines in FIG. 3, but are no longer present and do not constitute any break in the structure.

Figure 4:
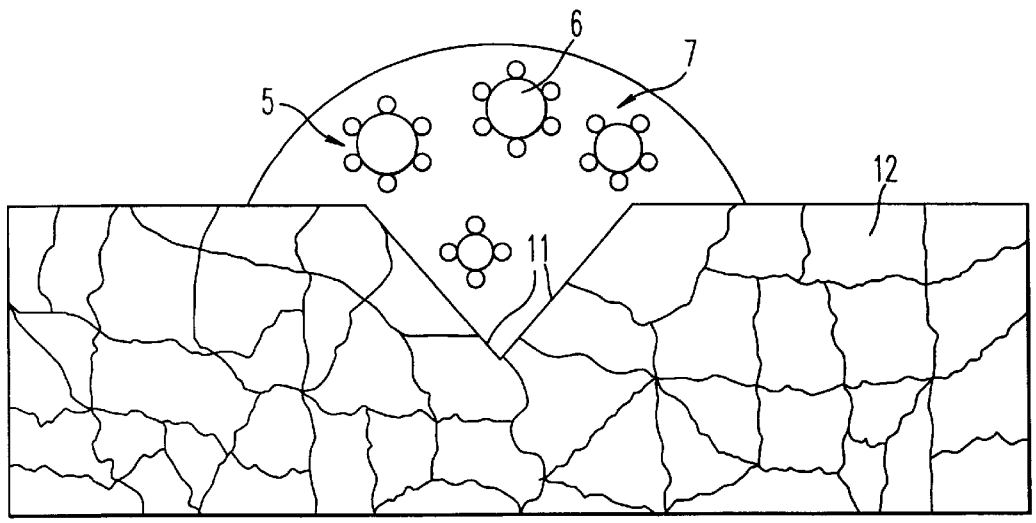
FIGS. 4,5 and 6 are diagrammatic views similar to FIGS. 1,2 and 3, but illustrating the physical chemistry states of the filler at three different stages during the repair of a superalloy part by a diffusion brazing method in accordance with the invention.
Figure 5:
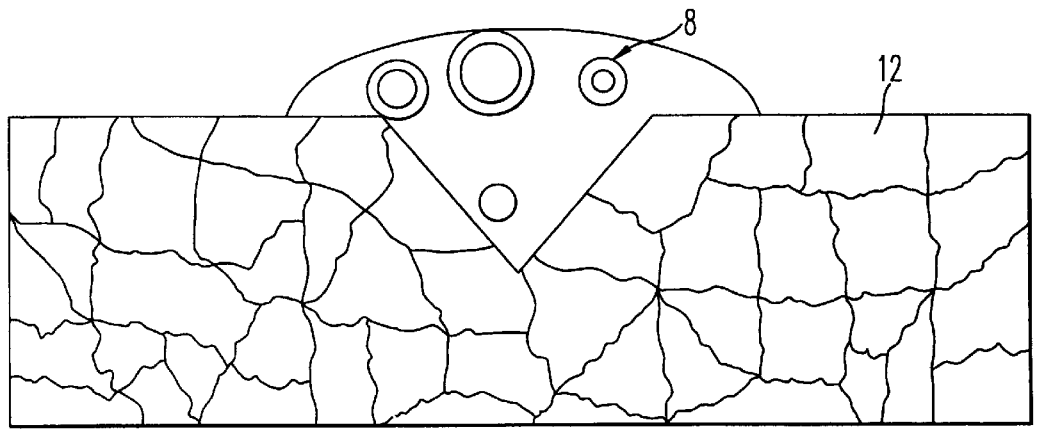
Figure 6:
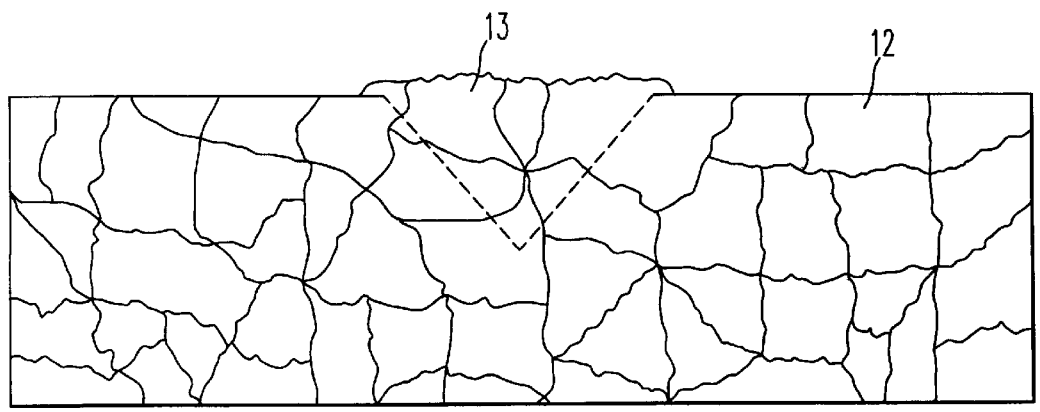

An example of the application of the diffusion brazing method in accordance with the invention as described above to the repair of a superalloy part is illustrated in FIGS. 4 to 6. As in the previous example, the single-component brazing powder 5 is deposited over the area 11 of the part 12 to be repaired as shown in FIG. 4. The powder 5 consists of grains 6 of superalloy having the flux elements 7 encrusted on their surface.

FIG. 5 shows the repair at the stage where the liquid phase 8 is produced, and FIG. 6 shows the repair after the diffusion treatment, in which a solidified layer 13 is formed having a metallographic structure which is homogeneous and bonded by diffusion to the walls of the part 12.

Depending on the particular applications of the diffusion brazing method in accordance with the invention, whether to the assembly of parts or to the repair of parts by filling cracks or by resurfacing to restore dimensions, the single-component brazing powder can be deposited in various forms. Thus, the brazing powder may be deposited with the addition of an organic binder which is known in itself and is selected so as to disappear by pyrolysis in the course of the thermal treatment without leaving any undesirable residue, particularly carbon-containing residue.

The filler may also be deposited in the form of a compact element prepared in advance using any suitable manufacturing technique. For example, the single-component brazing powder may be placed in a mould having a shape matching the shape to be obtained, and the self-brazable compact element is obtained after carrying out a thermal cycle causing compaction of the powder by sintering.

What is claimed is:

1. A method of diffusion brazing parts made of a superalloy A using a filler material obtained from a brazing powder, said method comprising the following steps:

(a) preparing a predetermined quantity of a superalloy powder having a composition identical to said superalloy A of said parts, and a quantity, in a weight ratio to said superalloy powder of between 0.1% and 40%, of a powder of at least one flux element selected from the group of boron and silicon;

(b) mixing the powders prepared in step (a) and placing the powder mixture together with a plurality of balls into a container, then closing the container and maintaining it under a controlled atmosphere, said balls and said container being made of said superalloy A;

(c) placing said container in a grinder and maintaining movement of the container for a period of from 30 seconds to 500 hours in order to incorporate the flux element onto the surface of the grains of said superalloy powder to thereby form a so-called single component powder;

(d) chemically cleaning the surfaces of said parts to be brazed in a bath;

(e) thermochemically treating said parts in a furnace;

(f) depositing a filler on said surfaces of said parts, said filler consisting of said single-component powder obtained in step (c);

(g) carrying out a thermal brazing cycle in said furnace wherein the temperature is increased in steps up to a brazing temperature of between 1050° C. and 1400° C. depending on the superalloy, and is then held for a time of from 15 to 30 minutes; and (h) carrying out a thermal diffusion treatment in said furnace under a controlled atmosphere for a period of between 4 and 16 hours.

2. The method as claimed in claim 1, wherein, after step (e), a first brazing operation is carried out comprising the steps:

(f1) depositing on the surfaces to be brazed a filler metal in the form of a conventional nickel- or cobalt-based brazing alloy and a flux element; and (f2) carrying out a thermal brazing cycle in the furnace wherein the temperature is increased to brazing temperature in 15 minutes, until the filler metal melts and said surfaces are wetted.

3. The method as claimed in claim 1, wherein, in step (f), said single-component powder is deposited with an addition of an organic binder.

4. The method as claimed in claim 1, wherein, in step (f), said filler is deposited in the form of a compact element obtained by placing said single-component powder obtained in step (c) into a mould having a shape matching the compact element to be obtained and carrying out a thermal cycle causing compaction of said powder by sintering.

5. The method as claimed in claim 1 wherein said diffusion brazing is carried out to join two superalloy parts together, and wherein, in step (f), said filler is deposited directly above the clearance separating the joint faces of said two parts.

6. The method as claimed in claim 1 wherein said diffusion brazing is carried out to repair a crack in a superalloy part and wherein, in step (f), said filler is deposited directly over said crack in said part to be repaired.

7. The method as claimed in claim 1 wherein said diffusion brazing is carried out to dimensionally restore a superalloy part by resurfacing a surface of said part, and wherein, in step (f), said filler is deposited on said surface which is to be resurfaced.

* * * * *

UNITED STATES PATENT AND TRADEMARK OFFICE
CERTIFICATE OF CORRECTION

PATENT NO.   : 6,109,505
DATED        : August 29, 2000
INVENTOR(S)  : Andre H.L. Malie, et al.

It is certified that error appears in the above-identified patent and that said Letters Patent is hereby corrected as shown below:

Title page,
Item [30], the Foreign Application Priority Information, is listed incorrectly. Item [30] should read as follows:
-- [30]      Foreign Application Priority Data
July 23, 1998    [FR] France ........................ 98 09396 --

Signed and Sealed this

Twenty-third Day of October, 2001

Attest:

*Nicholas P. Godici*

NICHOLAS P. GODICI
*Attesting Officer*      *Acting Director of the United States Patent and Trademark Office*